Dec. 19, 1944.                J. D. McKAHIN                2,365,201
                                  PLANTER
                          Filed Aug. 3, 1940          5 Sheets-Sheet 1

Inventor
J. D. McKahin
by
Attorney

Dec. 19, 1944. J. D. McKAHIN 2,365,201
PLANTER
Filed Aug. 3, 1940 5 Sheets-Sheet 2

Inventor
J. D. McKahin
by
Attorney

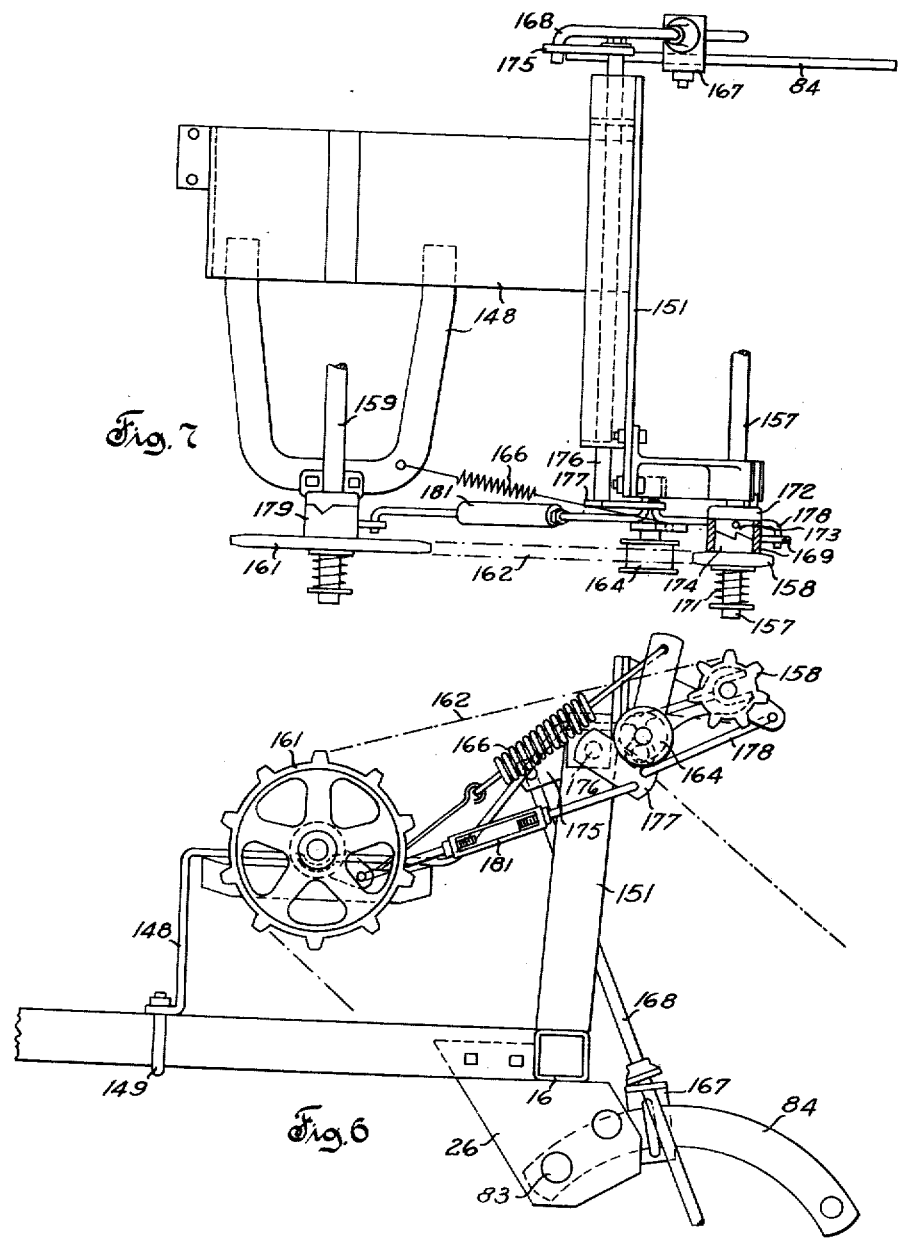

Patented Dec. 19, 1944

2,365,201

UNITED STATES PATENT OFFICE 2,365,201

PLANTER

John D. McKahin, La Crosse, Wis., assignor to Allis-Chalmers Manufacturing Company, Milwaukee, Wis., a corporation of Delaware Application August 3, 1940, Serial No. 350,686

22 Claims. (Cl. 111—59)

The invention relates to agricultural implements, and it is concerned more specifically with a machine having a soil engaging tool, such as the seed or fertilizer runner of a planter, which tool is required to penetrate the soil to an even depth as the machine advances over the field.

It is an object of the invention to provide an agricultural machine in which the depth of soil penetration of a furrow opening tool is controlled in an improved manner so that the furrow opened by the tool will be of substantially constant depth not only on level ground but also on undulating ground presenting small hills and valleys which are not followed by the machine as a whole.

A further object of the invention is to provide an agricultural machine having a tool or tools for opening a furrow or a plurality of furrows of substantially constant depth, and other tools which work the soil as the machine is being advanced over the field, and in which machine the depth of soil penetration of said other tools may be adjusted while the machine is in motion, without changing the operating depth of said furrow opening tool or tools.

A further object of the invention is to provide an improved planting machine having a runner and soil working tools operating simultaneously to form a furrow of substantially constant depth and to work the soil as the machine advances, and in which machines the runner may be raised to an elevated position above the ground by upward adjustment of the soil working tools.

More specifically it is an object of the invention to provide an improved mechanism for transmitting upward movement of the soil working tools to the runner, which mechanism permits the runner to operate at a substantially constant depth irrespective of whether the soil working tools work deep or shallow, and which mechanism may be operated to raise the runner to an elevated position above the ground while the soil working tools remain in the ground. When it becomes necessary to clear the runner of trash which has accumulated around it during the advance of the machine, the operator may manipulate the improved mechanism to lift the runner without lifting the soil working tools and he is therefore relieved of the exertion to lift the soil working tools every time he wants to clear the runner of trash. On the other hand, the improved mechanism enables the operator to lift the runner and the soil working tools in one operation when he desires to elevate the runner and the soil working tools above the ground for turning or for moving the machine to or from the field.

A further object of the invention is to provide a machine having a runner and soil working tools, in which the runner may automatically adjust itself to a predetermined depth of soil penetration while the soil working tools are in the ground but may be raised out of the ground by upward adjustment of the soil working tools above the ground, and in which machine a power driven dispensing mechanism for material, such as seed or ferilitzer, to be deposited in the runner furrow, may be automatically stopped by said upward adjustment of said soil working tools above the ground.

A further object of the invention is to provide an improved planting attachment for installation on a cultivator frame.

Another object of the invention is to provide an improved tractor propelled implement for simultaneously planting seed and fertilizing the soil in proximity to the seed, the improvement consisting in the construction of the planting and fertilizing equipment and in its arrangement relative to the tractor.

Another object of the invention is to provide an auxiliary tool support forming part of a planting attachment for installation on the tool bars of a tractor mounted cultivator frame, the auxiliary tool support being so constructed that it may be placed on the ground and the tractor, with the cultivator frame mounted thereon, may be driven over the auxiliary tool support into a position permitting ready attachment of the auxiliary tool support to the tool bars of the cultivator frame.

A still further object of the invention is to provide a tractor propelled implement for planting seed and fertilizing the soil in proximity to the seed, which implement is simple and compact in construction, efficient in operation, and which may be manufactured at relatively low costs.

These and other objects and advantages of the invention, and the operation of a machine constructed in accordance therewith, will be apparent from the following description of a preferred embodiment of the invention shown in the drawings accompanying and forming part of this specification. Referring to the drawings, in which like reference characters designate the same or similar parts in the various views:

Fig. 6 is a detail view of the drive and throw-out mechanism for the seed and fertilizer dispensing units shown in Fig. 1; and Fig. 7 is a top view, partly in section, of the parts shown in Fig. 6.

Figure 1:
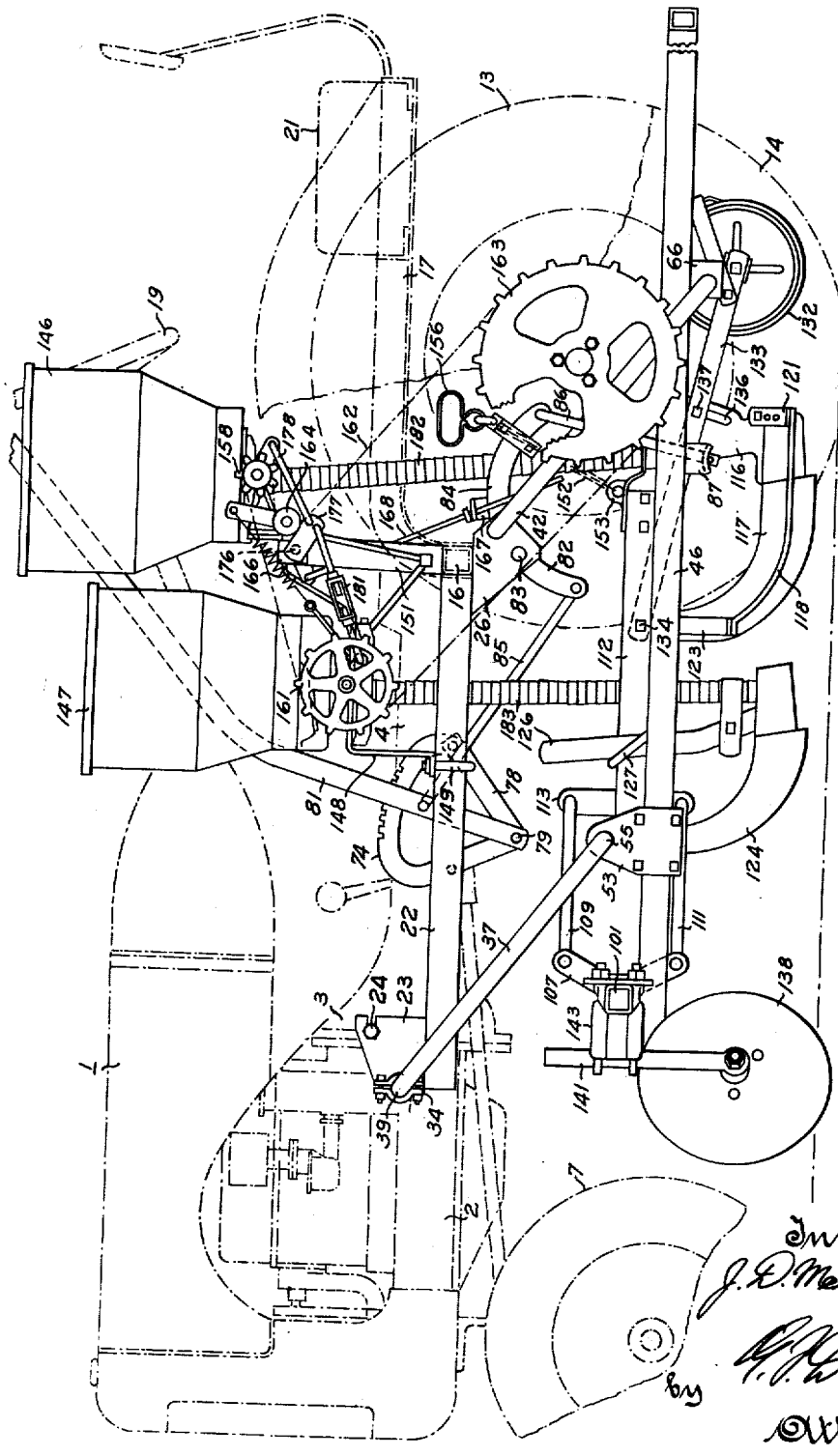
Fig. 1 is a side view of a tractor mounted implement for combined soil working, seed planting and fertilizing, the implement having parts arranged between the rear wheels of the tractor, and most of the near rear wheel of the tractor and its fender being broken away to expose said parts.
Figure 2:
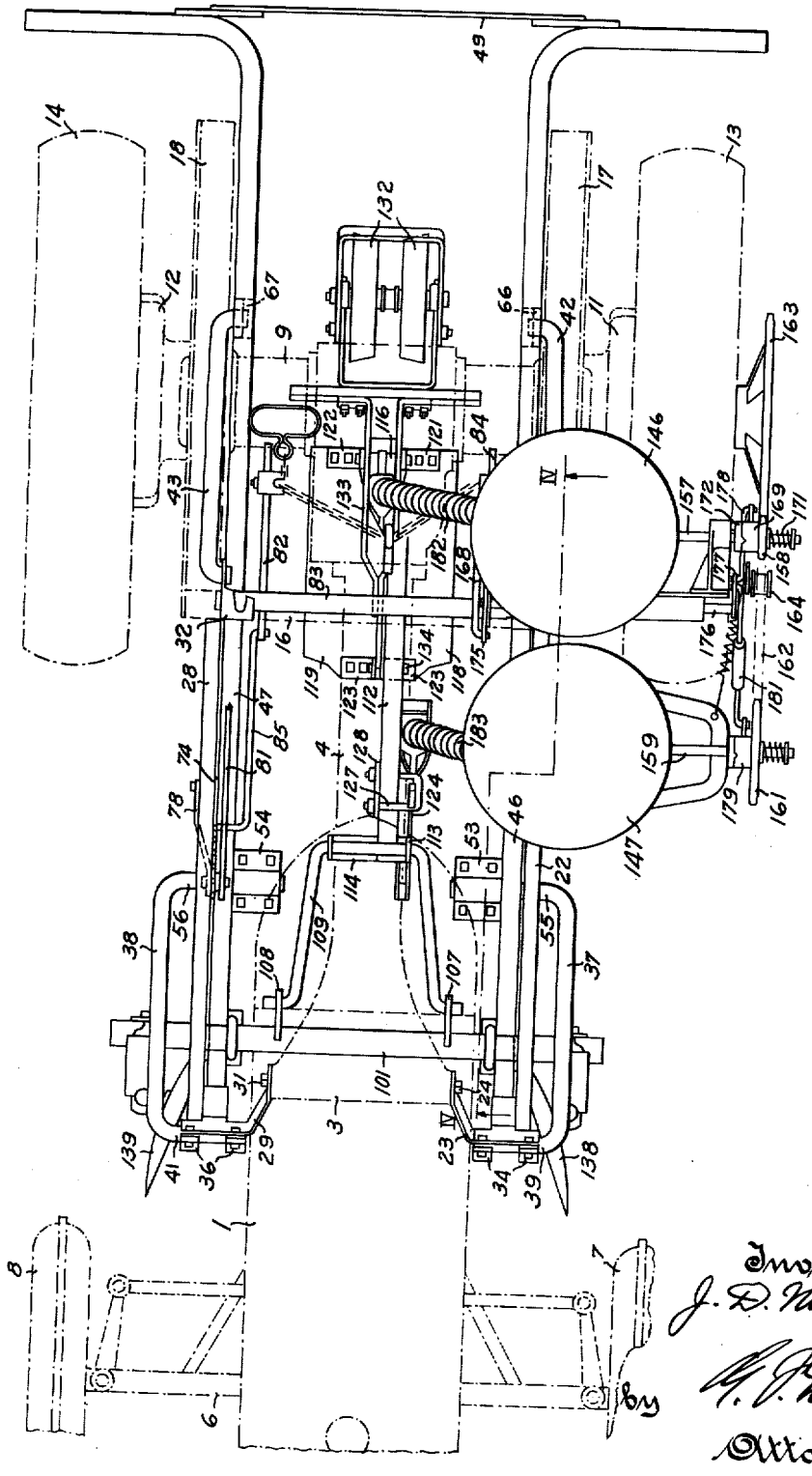
Fig. 2 is a top view of the machine shown in Fig. 1.
Figure 3:
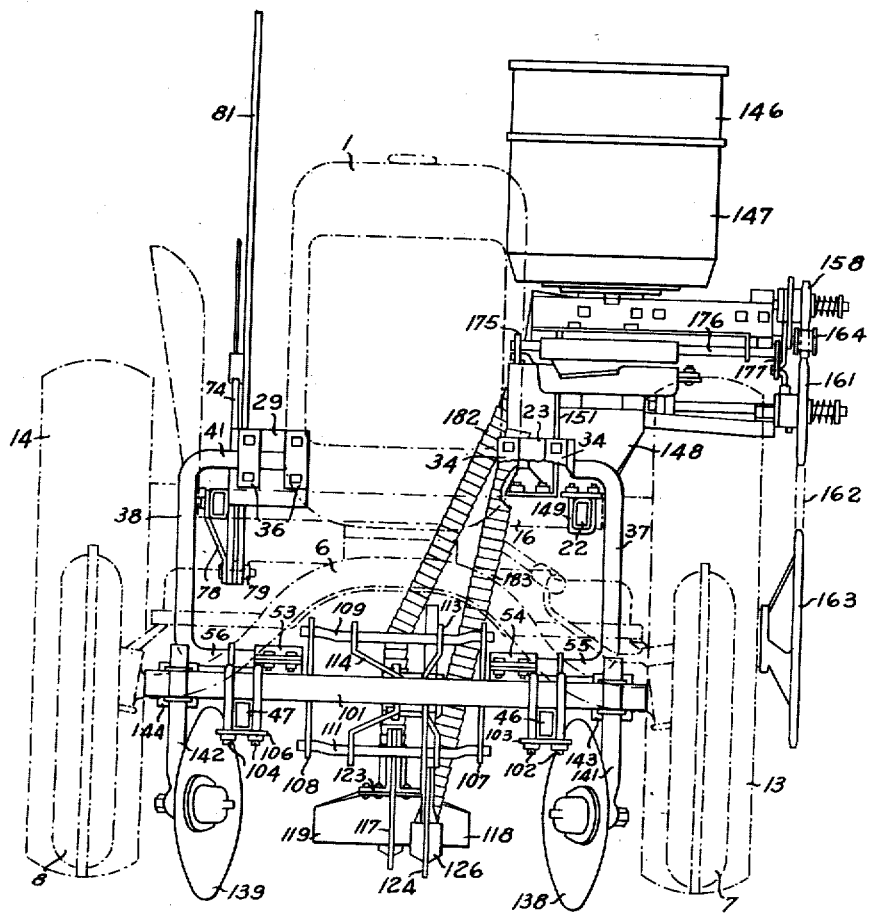
Fig. 3 is a front view of the machine shown in Figs. 1 and 2.

A frameless type tractor shown in dash-dotted lines in Figs. 1, 2 and 3, and generally indicated by the reference numeral 1, has a motor 2 connected to a bell housing 3 which is integrally formed with a torque tube 4. The front end of the motor is supported on an upwardly arched front axle structure 6 which carries dirigible front wheels 7 and 8. The torque tube 4 is connected at its rear end to an upwardly arched rear axle structure comprising a transverse portion 9 and depending side portions 11 and 12, and mounted on the side portions 11 and 12 are rear traction wheels 13 and 14 which are drivingly connected with the motor 2 through the usual power transmitting mechanisms. A tubular cross bar 16 is secured to and extends through the rear portion of the torque tube 4, the cross bar 16 being connected at its ends to side bars 17 and 18 which are mounted on the transverse portion 9 of the rear axle structure. A steering wheel 19 which is operatively connected with the front wheels 7 and 8 is within easy reach from an operator's seat 21 of the tractor. For a fuller disclosure of the tractor here shown reference is made to application Serial No. 274,164, filed May 17, 1939, C. E. Frudden and W. F. Strehlow, Tractor, now Patent No. 2,254,358, granted September 2, 1941.

A tubular beam 22 extending longitudinally of the tractor 1 is secured at the left side of the tractor to the bell housing 3 by a bracket 23 and bolts 24. The rear end of the beam 22 is secured to a bracket 26 which is bolted to a portion of the cross bar 16 between the torque tube 4 and the side bar 17. A tubular beam 28, similar to the beam 22 is secured at the right side of the tractor to the bell housing 3 by a bracket 29 and bolts 31 corresponding to the bracket 23 and bolts 24. The rear end of the right beam 28 is secured to a bracket 32 corresponding to the bracket 26, the bracket 32 being bolted to a portion of the cross bar 16 between the torque tube 4 and the right side bar 18. Secured to the forward brackets 23 and 29 are cap members 34 and 36, respectively, which cooperate with semicylindrical recesses in the brackets to form journal bearings for a pair of links 37 and 38. The links 37 and 38 have upper journals 39 and 41, respectively, within the bearings on the brackets 23 and 29, the journals being retained in the bearings against axial displacement, and the bearings and journals being of sufficient length to prevent transverse swinging movement of the links 37 and 38. A rearward pair of links 42 and 43, equal in length to the forward links 37 and 38, are mounted for pivotal movement on the brackets 26 and 32, respectively, the rearward links 42 and 43 having horizontal upper journals received within bearing holes of the brackets 26 and 32.

A main tool support positioned beneath the tractor 1 comprises a pair of L-shaped tool bars 46 and 47, which are connected at their rear ends by an upwardly arched rear bar 48. The short or transverse legs of the L-shaped tool bars extend in rear of the traction wheels 13 and 14 for carrying track eradicating shovels, not shown. The long legs or longitudinal portions of the L-shaped tool bars 46 and 47 are pivotally connected with the forward links 37 and 38, respectively, by brackets 53 and 54, and with the rearward links 42 and 43, respectively, by depending angle clips 66 and 67 which are welded to the bottom faces of the tool bars 46 and 47. The forward links 37 and 38 have horizontal lower journals 55 and 56, respectively, which are mounted in journal bearings of the brackets 53 and 54, and are suitably retained therein against axial displacement. The lower journals 55 and 56, like the upper journals 39 and 41 of the forward links 37 and 38, are of comparatively great length and the journal bearings of the brackets 53 and 54 in which the lower journals 55 and 56 are mounted are correspondingly long to retain the tool bars 46 and 47 against transverse tilting and horizontal angular displacement relative to the tractor. The lower pivot center of the left forward link 37 at the bracket 53 is spaced from the lower pivot center of the left rearward link 42 at the clip 66 substantially the same distance as the upper pivot center of the left forward link 37 at the bracket 23 is spaced from the upper pivot center of the left rearward link 42 at the bracket 26. Similarly, the lower pivot center of the right forward link 38 at the bracket 54 is spaced from the lower pivot center of the right rearward link 43 at the clip 67 substantially the same distance as the upper pivot center of the right forward link 38 at the bracket 29 is spaced from the upper pivot center of the right rearward link 43 at the bracket 32. The upper journals 39 and 41 of the forward links 37 and 38 are alined on a common pivot axis, and so are the lower journals 55 and 56 of these links, as may be seen from Fig. 3. Likewise, the upper pivot center of the left rear link 42 is alined with the upper pivot center of the right rear link 43, and the lower pivot center of the left rear link 42 is alined with the lower pivot center of right rear link 43, as may be seen from Fig. 2. It will be seen that the links 37, 38 and the links 42, 43 function to guide the main tool support comprising the L-shaped tool bars 46 and 47 for vertical translatory movement relative to the tractor 1, the links 37, 38 and the links 42, 43 being part of a parallel link mechanism mounted on the tractor, and that the tractor forms a self-sustained traveling support for the parallel link mechanism.

Mounted on the tubular beam 28 at the right side of the tractor, substantially midway between the brackets 29 and 32, is a quadrant 74 which has a forward leg extending downwardly below the beam 28 and the lower end of the leg is braced against the beam 28 by a strap 78 secured at the lower end to the leg of quadrant 74 by a bolt 79. A hand lever 81 having a suitable latch mechanism for engagement with teeth on the quadrant 74 is pivoted on the bolt 79 at the lower end of the leg of the quadrant 74. An operating link 85 interconnects the hand lever 81 with the short arm of a bell crank lever 82 which is welded to a rock shaft 83 pivotally mounted on the brackets 26 and 32. An arcuate lifting arm 84 located near the bracket 26 is welded to the rock shaft 83 in the same radial position on the shaft 83 as the longer arm of the bell crank lever 82.

Pivotally connected with the lifting arm 84 is a lifting rod 86 which has a lower end portion rockably secured to a clip 87 welded to the left tool bar 46. A lifting rod 88, similar to the lifting rod 86, is pivotally connected to the longer arm of the bell crank lever 82 at a radial distance from the axis of the rock shaft 83 equal to the radial distance of the pivot center of the rod 86 on the arm 84 from the axis of the rock shaft 83. The lower end of lifting rod 88 is rockably secured to the L-shaped tool bar 47 in the same manner in which the lifting rod 86 is secured to the tool bar 46. Coil springs, not shown, surrounding the lifting rods 86 and 88 may be used to exert downward pressure upon the tool bars 46 and 47.

Referring to Fig. 1, the hand lever 81 may be moved from the position in which it is shown in Fig. 1 either in a forward or rearward direction about its pivot center at the bolt 79, and it will be understood that forward movement of the hand lever lowers the main tool support while movement of the hand lever to the rear causes upward movement of the main tool support. Due to the guiding action of the parallel links 37, 38 and 42, 43, the main tool support may be raised and lowered with a translatory movement by manipulation of the hand lever 81, and the main tool support my be retained in a plurality of vertically adjusted positions by locking the hand lever in different positions on the quadrant 74. Balancing springs, not shown, may be used to assist the operator in raising the main tool support.

Reference is here made to a copending application Serial No. 282,336, filed July 1, 1939, C. E. Frudden, W. H. Tanke and A. G. Buhr, Tractor implement, now Patent No. 2,247,367, granted July 1, 1941, which more fully discloses the construction of the main tool support and its adjusting mechanism outlined hereinbefore, and which application also claims features of said main tool support and its adjusting mechanism. As shown in the mentioned Frudden et al. application, cultivating tools may be mounted on the long legs of the L-shaped tool bars for cultivating the ground at opposite sides of a plant row which is straddled by the tractor, and the mentioned application also shows the track eradicating shovels which have been mentioned hereinbefore mounted on the short legs of the tool bars. In other words, the L-shaped bars 46 and 47 herein disclosed are the tool bars of a cultivator attachment, and as will be seen from the following description these tool bars are being used in the present instance for carrying an auxiliary tool support of novel construction.

Referring to Figs. 2 and 3, a tubular cross bar 101 rests on top of the tool bars 46 and 47 a short distance behind the forward ends of the latter, the cross bar bridging the space between the tool bars and extending outwardly beyond the tool bars in opposite directions. A pair of U-bolts 102 straddles the cross bar 101 at opposite sides of the tool bar 46, and a tie plate 103 is drawn up against the bottom surface of the tool bar 46 by nuts on the U-bolts 102. The cross bar 101 is secured to the tool bar 47 by a pair of U-bolts 104 and a tie plate 106 similar to the U-bolts 102 and plate 103 which secure the cross bar to the tool bar 46. A bracket plate 107 having upper and lower bearing lugs is secured in an upright position to the cross bar 101 a relatively short distance from the inner side of the tool bar 46, and a similar bracket plate 108 is secured to the cross bar 101 in an upright position a relatively short distance from the inner side of the tool bar 47. Pivotally mounted in the upper bearing lugs of the bracket plates 107 and 108 is an upper link 109 which is formed in the shape of a bail as shown in Fig. 2. Another link 111 is pivoted in the lower bearing lugs of the bracket plates 107 and 108, the link 111 being likewise formed in the shape of a bail and an exact duplicate of the link 109. The bight portions of the bails 109 and 111 are pivotally mounted in a bracket structure at the forward end of a runner beam 112 which extends longitudinally in the space between the tool bars 46 and 47. The bracket structure at the forward end of the runner beam comprises two bracket plates 113 and 114 which are secured to the sides of the runner beam 112 and which have horizontally spaced upper bearing lugs receiving the bight portion of the bail 109 and horizontally spaced lower bearing lugs receiving the bight portion of the bail 111, as may be seen from Fig. 3. The runner beam 112 extends rearwardly between the tool bars 46 and 47 into the space between the rear traction wheels 13 and 14, and secured to the rear end of the runner beam 112 in the space between the rear traction wheels 13 and 14 is a planter shank 116. The planter shank is offset towards the right side of the runner beam, as shown in Fig. 2, and a runner 117 for opening a seed furrow is secured to the lower end of the planter shank 116 and has a forward supporting connection with the runner beam 112. A pair of ground engaging skids 118 and 119 are mounted at opposite sides of the runner 117, the skids being in the form of plate members having substantially horizontal rearward portions secured to angle clips 121 and 122, respectively, and upwardly curved forward portions secured to a pair of angle clips 123 at opposite sides of the runner 117. The angle clips supporting the skids are vertically adjustable on the runner 117 in order to control the depth to which the runner 117 may sink into the ground.

Another runner 124 for opening a fertilizer furrow is mounted on the runner beam 112 in advance of the runner 117. The runner 124 is secured at its rear end to a shank 126 which is drawn up against the left side of the runner beam 112 by means of a U-bolt 127 and a plate 128. The forward upwardly curved portion of the runner 124 has a vertically adjustable connection 131 with a depending arm 129 secured to the runner beam 112. It will be seen that the runner 124 may be vertically adjusted relative to the runner beam 112 by means of the U-bolt connection 127 and 128, and by means of the vertically adjustable connection 131 at the depending arm 129, shown only in Fig. 4. The runner 124 is offset towards the left side of the runner beam 112, as shown in Fig. 2, so as to open a fertilizer furrow a short distance to the left of the seed furrow which is being opened by the runner 117. Referring to Fig. 1, a press wheel 132 for closing the furrow opened by the runner 117 is mounted on a forked support 133 which embraces the planter shank 116 and has a forward pivotal connection 134 with the runner beam 112. The shank 116 has an arcuate slot 136 which accommodates a bolt 137 connecting the arms of the forked press wheel support 133, but the press wheel support is not clamped against the runner shank and is freely movable up and down about its pivotal connection 134 with the runner beam 112. It will be seen that the press wheel is mounted on the runner beam 112 for self-adjusting vertical movement and that the bolt 137 may slide up and down in the arcuate slot 136 when the press wheel moves up or down.

The bails 109 and 111 cooperate with the bracket structure 107, 108 on the cross bar 101 and with the bracket structure 113, 114 on the runner beam 112 to connect the runner beam 112 with the cross bar 101 for vertical translatory movement and it will be noted that downward movement of the beam 112 is limited by engagement of the skids 118 and 119 with the ground. The skids 118 and 119 on the other hand function to support the runner beam for tilting movement in a vertical plane extending longitudinally of the tractor but the beam 112 is prevented from tiltably moving in said plane by the bails 109 and 111 which, in effect, form a parallel link connection between the beam 112 and the cross bar 101.

Mounted on the outwardly projecting ends of the cross bar 101 are two hilling disks 138 and 139 which are positioned to work two transversely spaced strips of ground between the tread lines of the front and rear wheels of the tractor. The runners 117 and 124 work in the space between the strips of soil which are worked by the disks 138 and 139, and the disks may be set to throw the soil either inwardly towards the center between the tread lines of the tractor or outwardly towards the tread lines of the tractor. In Figs. 2 and 3, the disks are shown in position to throw the soil inwardly towards the center between the tread lines of the tractor. Vertical standards 141 and 142 on which the disks 138 and 139 are mounted are secured to the cross bar 101 by suitable clamping devices 143 and 144 which permit adjustment of the operating depths of the disks 138 and 139. It will be noted that the operating depths of the disks 138 and 139 may be adjusted collectively by operation of the hand lever 81, but that such collective adjustment of the disks 138 and 139 does not cause upward or downward movement of the runner beam 112. As explained hereinbefore the runner beam is sustained on the skids 118 and 119, and the parallel link mechanism 109 and 111, which prevents forward or rearward tilting of the runner beam, accommodates any upward or downward movement of the main tool support 46 and 47 without causing the runner beam 112 to change its vertical position relative to the ground.

Figure 5:
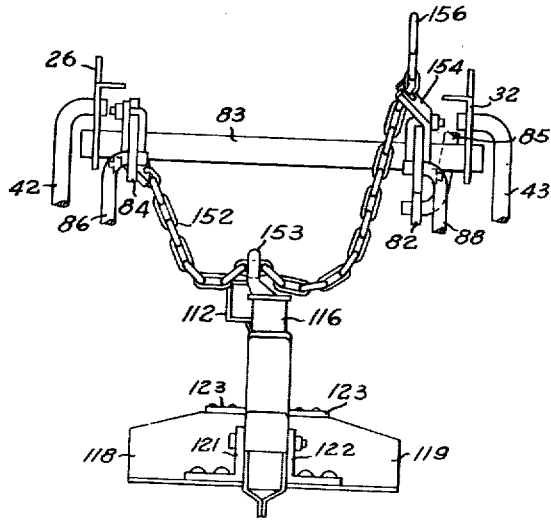
Fig. 5 is a rear view of parts shown in Fig. 4.

Secured to the arm 84 which extends radially from the rock shaft 83 is the end of a chain 152 which is looped through an eye 153 on the runner shank 116, and the other end of the chain is detachably hooked into a bracket 154 which is secured to the rearwardly extending long arm of the bell crank lever 87. A handle 156 at the end of the chain which is hooked into the bracket 154 may be reached from the operator's seat in order to unhook the chain and pull it upwardly, and it will be noted that by such upward pull on the chain 152 the runner beam may be raised to an elevated position above the ground independently of any upward movement of the main tool support comprising the tool bars 46 and 47. When the chain is pulled upwardly the runner beam rises with a translatory movement due to the guiding action of the links 109 and 111. In normal operation the chain is somewhat slack as shown in Fig. 5 so that the runner beam may rise and fall due to small hills and valleys over which the skids 118 and 119 ride during the advance of the machine. However, when the main tool support is raised a substantial distance so as to move the disks 138 and 139 and the track eradicating shovels behind the tractor wheels 13 and 14 out of the ground, the slack of the chain will be taken up, and upward movement will be imparted to the runner beam after the disks 138 and 139 and the track eradicating shovels have left the ground. During the operation of the machine trash may accumulate around the runners 117 and 124 and in order to clear the runners of such trash the operator may grasp the handle 156 and pull the runners 117 and 124 out of the ground until they have passed over the trash and then lower the chain again and adjust it to the desired slack position. It will be seen that such adjustment of the runner beam may be effected without the necessity of raising the main tool support comprising the tool bars 46 and 47, and that the operator is therefore relieved of the effort of raising the main tool support every time he wants to clear the runners of trash.

A seed hopper 146 and a fertilizer hopper 147 are mounted on the tractor in a stationary position so that the auxiliary tool support comprising the runner beam 112 is not loaded down by any weight of the hoppers 146 and 147. A bracket 148 for supporting the seed hopper 146 and the fertilizer hopper 147 has a forward supporting connection with the left bar 22 and is retained thereon by a U-bolt 149. A supporting structure 151 for the rear end of the bracket 148 is secured to the cross bar 16 by a pair of bolts, as may be seen from Fig. 3.

A dispensing mechanism of any well known construction is used to discharge seed from the seed hopper 146 and includes a drive shaft 157, which carries a drive sprocket 158. Also mounted on the bracket 148 is a shaft 159 for driving a dispensing mechanism cooperating with the fertilizer hopper 147, the shaft 159 carrying a drive sprocket 161. The sprockets 158 and 161 are driven by a chain 162 which is trained over a drive sprocket 163 secured to the outer side of the left traction wheel 13. A roller 164 for tightening the chain 162 is swingably mounted on the supporting structure for the seed hoppers 146 and 147 and a spring 166 is suitably arranged to pull the roller 164 into engagement with the chain 162.

A throwout mechanism is provided to stop both the fertilizer and the seed dispensing mechanisms when the main tool support is raised to lift the disks 138 and 139 and the track eradicating shovels out of the ground. The throwout mechanism is more clearly shown in Figs. 6 and 7 and is constructed as follows. Secured to the rearwardly extending lifting arm 84, is a bracket 167 which bears against a collar on a push rod 168. The push rod 168 is pivoted at its upper end on a forwardly extending arm 175 of a rock shaft 176 journaled on the support 151, the rock shaft 176 having a rearwardly extending arm 177 at the outer side of the support 151. A link 178 connects the arm 177 with an arm of a sleeve 169 surrounding the shaft 157 and having a plain end face bearing against the hub of the sprocket wheel 158 at the inner side of said sprocket wheel. The sprocket wheel 158 is rotatably mounted on the shaft 157 for axial sliding movement relative thereto and a coil spring 171 urges the sprocket wheel 158 against the sleeve 169. Formed at the end of the sleeve 169 remote from the sprocket wheel 158 is a cam face which cooperates with a cam casting 172 surrounding the shaft 157 and secured in fixed position on the support for said shaft. Upward movement of the push rod 168 causes axial displacement of the sprocket wheel 158 against the pressure of the coil spring 171 due to the cooperation of the cam face on the sleeve 169 with the cam casting 172. This axial displacement of the sprocket wheel 158 is utilized to disengage a jaw clutch within the sleeve 169. The jaw clutch arranged within the sleeve 169 comprises a driven clutch member 173 which is pinned to the shaft 157 and a driving clutch member 174 which is formed integrally with the sprocket wheel 158.

In Fig. 7, the sprocket wheel 158 is shown in driving engagement with the shaft 157 due to clutching engagement of the driven clutch member 173 with the driving clutch member 174, and it will be understood that such driving engagement is established by downward movement of the main tool support so as to bring the disk 138 and the track eradicating shovels into the ground. When the main tool support is raised sufficiently to lift the runners 117 and 124 out of the ground, as has been explained hereinbefore, the sleeve 169 is rotated by pull on the link 178 and as a result the sprocket wheel 158 is axially displaced to disengage the driving clutch member 174 from the driven clutch member 173.

The sprocket wheel 161 of the fertilizer dispensing mechanism is rotatably mounted on the shaft 159 for axial displacement in the same manner as has just been described in connection with the sprocket wheel 158 and shaft 157. A jaw clutch and operating sleeve 179, corresponding to the jaw clutch 173, 174 and operating sleeve 169, are provided to establish and interrupt transmission of power from the sprocket wheel 161 to the shaft 159. The operating sleeve 179 is connected with the arm 177 by a link connection including a turnbuckle 181. Actuation of the arm 177 to interrupt the transmission of power from the sprocket wheel 158 to the seeder shaft 157 also operates to interrupt the transmission of power from the sprocket wheel 161 to the fertilizer shaft 159, and the turnbuckle 181 is provided to adjust the length of the link connection between the arm 177 and the arm of the sleeve 179 so that the power will be disconnected simultaneously from both the seeder shaft 157 and the fertilizer shaft 159 when the rod 168 is pushed upwardly far enough for effecting the interruption of power.

A flexible tube 182 is connected at its upper end to the discharge spout of the hopper 146 and at its lower end to the planter shank 116 so that seed discharged from the hopper 146 by the seed dispensing mechanism will be delivered into the furrow opened by the runner 117. Another flexible tube 183 is connected at its upper end to the discharge spout of the fertilizer hopper 147 and at its lower end to the runner 124 for conveying fertilizer discharged from the hopper 147 into the furrow opened by the runner 124.

Referring to Figs. 2 and 3 it will be noted that the length of the cross bar 101 is somewhat shorter than the spacing between the inner sides of the front wheels 7 and 8 of the tractor. The cross bar 101, the parallel link mechanism 109, 111, and the runner beam together with the runners 117 and 124 and the press wheel 132 may be removed, as a unit, from the main tool support comprising the tool bars 46 and 47. For this pur- pose it is necessary to remove the hilling disks 138 and 139 together with their standards 141 and 142 from the cross bar 101, to remove the U-bolts 102 and 104 which connect the cross bar 101 to the tool bars 46 and 47; and to disconnect the tubes 182 and 183 and the chain 152. The unit may then be pulled forwardly a short distance to cause the front tool bar 101 to drop to the ground. Since the length of the tool bar 101 is shorter than the spacing of the front wheels 7 and 8 the tractor together with the main tool support may be driven away from the disconnected unit in a rearward direction. Similarly, in order to attach the unit comprising the cross bar 101, the parallel link mechanism 109, 111, the runner beam 112 together with the runners 117 and 124 and the press wheel 132, the unit may be placed on the ground and the tractor, with the main tool support mounted thereon, may be driven over the unit into an attaching position, whereupon the cross bar 101, may be lifted upon the tool bars 46 and 47 and secured thereto by means of the U-bolts 102 and 104 and the plates 103 and 106. After the cross bar 101 has been secured to the tool bars the hilling disks 138, 139 may be mounted on the cross bar.

Figure 4:
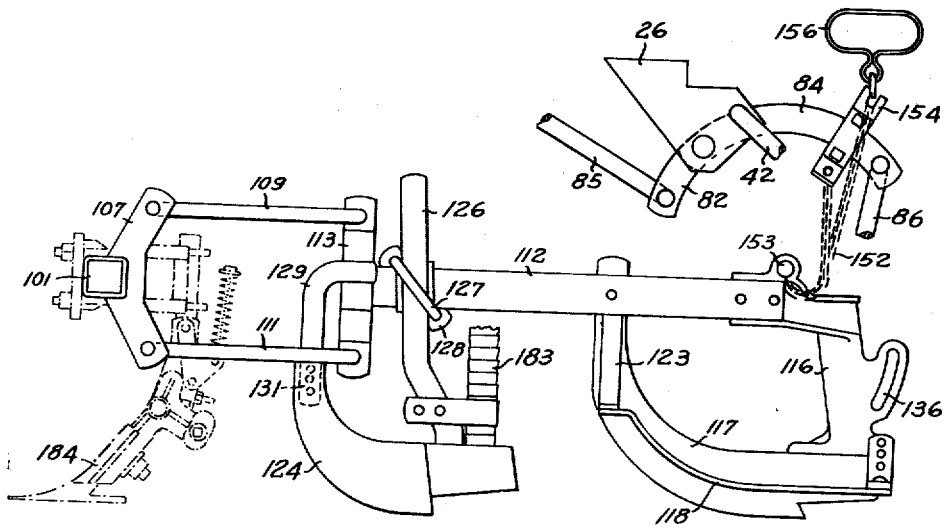
Fig. 4 is a detail view of the runner beam and associated parts shown in Fig. 1, the view being taken on line IV—IV of Fig. 2 and also showing, in dash-dotted lines a sweep attachment which may be used to work the soil in advance of the runners.

As shown in Fig. 4, a sweep 184 may be mounted on the cross bar 101 between the bracket plates 107 and 108 in order to work the soil in advance of the runners 117 and 124 if desired. The sweep 184 may be adjusted vertically relatively to the cross bar 101, and when the main tool frame is raised or lowered to adjust the working depth of the disks 138 and 139, the sweep 184 will partake in such adjusting movement. The depth of the furrows formed by the runners 117 and 124 is determined by the vertical positioning of the skids 118 and 119 relative to the runner 117, and the runners are forced into the ground solely by the weight of the runner beam 112 and the parts directly mounted thereon, such as the planter shank 116 and the forward runner supports 126 and 129. In other words, the runners 117 and 124 are pressed into the ground solely by forces of gravity acting upon the auxiliary tool support and when the runners approach a hill or valley the skids 118 and 119 will gauge the depth of the furrows formed by the runners in the same manner as when the machine is working on level ground so that the depth of the furrows formed by runners 117 and 124 will remain the same irrespective of whether the ground is level or undulating.

It should be understood that it is not desired to limit the invention to the exact details of construction herein shown and described for various modifications within the scope of the appended claims may occur to persons skilled in the art.

It is claimed and desired to secure by Letters Patent:

1. An agricultural implement comprising, a self-sustained traveling support, a main tool support, adjusting means connecting said main tool support with said traveling support for vertical movement of said main tool support relative to said traveling support, an auxiliary tool support, means cooperating with said main and auxiliary tool supports to connect said auxiliary tool support with said main tool support for vertical movement relative thereto, ground engaging means mounted on said auxiliary tool support for forming a furrow and for gauging the depth of said furrow, said ground engaging means being pressed downwardly upon the ground solely by forces of gravity acting upon said auxiliary tool support, a hopper mounted on said traveling support, and means for delivering material from said hopper into said furrow.

2. An agricultural implement comprising, a self-sustained traveling support, a main tool support, adjusting means connecting said main tool support with said traveling support for vertical movement of said main tool support relative to said traveling support, tools mounted on said main tool support for movement into and out of the ground by said vertical movement of said main tool support, an auxiliary tool support, means cooperating with said main and auxiliary tool supports to connect said auxiliary tool support with said main tool support for vertical movement relative thereto, ground engaging means mounted on said auxiliary tool support for forming a furrow in soil prepared by said tools and for gauging the depth of said furrow, said ground engaging means being pressed downwardly upon the ground solely by forces of gravity acting upon said auxiliary tool support while said main tool support occupies a position of vertical adjustment relative to said traveling support causing said tools on said main tool support to penetrate the ground to a predetermined adjustable depth, a hopper mounted on said traveling support, and means for delivering material from said hopper into said furrow.

3. An agricultural implement comprising, a self-sustained traveling support, a main tool support, adjusting means connecting said main tool support with said traveling support for vertical movement of said main tool support relative to said traveling support, tools mounted on said main tool support for movement into and out of the ground by said vertical movement of said main tool support, an auxiliary tool support, means cooperating with said main and auxiliary tool supports to connect said auxiliary tool support with said main tool support for vertical movement relative thereto, ground engaging means mounted on said auxiliary tool support for forming a furrow in soil prepared by said tools and for gauging the depth of said furrow, said ground engaging means being pressed downwardly upon the ground solely by forces of gravity acting upon said auxiliary tool support while said main tool support occupies a position of vertical adjustment relative to said traveling support causing said tools on said main tool support to penetrate the ground to a predetermined adjustable depth, a hopper mounted on said traveling support, means for delivering material from said hopper into said furrow including a dispensing mechanism and clutch means for transmitting power to said dispensing mechanism, and actuating means for said clutch means operatively connected with said adjusting means, whereby the transmission of power to said dispensing mechanism may be automatically stopped by upward adjustment of said main tool support.

4. An agricultural implement comprising, a self-sustained traveling support, a main tool support, adjusting means connecting said main tool support with said traveling support for vertical movement of said main tool support relative to said traveling support, tools mounted on said main tool support for movement into and out of the ground by said vertical movement of said main tool support, an auxiliary tool support, means cooperating with said main and auxiliary tool supports to connect said auxiliary tool support with said main tool support for vertical movement relative thereto, ground engaging means mounted on said auxiliary tool support for forming a furrow in soil prepared by said tools and for gauging the depth of said furrow, said ground engaging means being pressed downwardly upon the ground solely by forces of gravity acting upon said auxiliary tool support while said main tool support occupies a position of vertical adjustment relative to said traveling support causing said tools on said main tool support to penetrate the ground to a predetermined adjustable depth, a hopper mounted on said traveling support, means for delivering material from said hopper into said furrow, and lost motion connecting means between said auxiliary tool support and said adjusting means, whereby said auxiliary tool support may be raised to an elevated position above the ground by upward adjustment of said main tool support.

5. An agricultural implement comprising, a self-sustained traveling support, a main tool support, adjusting means connecting said main tool support with said traveling support for vertical movement of said main tool support relative to said traveling support, tools mounted on said main tool support for movement into and out of the ground by said vertical movement of said main tool support, an auxiliary tool support, means cooperating with said main and auxiliary tool supports to connect said auxiliary tool support with said main tool support for vertical movement relative thereto, ground engaging means mounted on said auxiliary tool support for forming a furrow in soil prepared by said tools and for gauging the depth of said furrow, said ground engaging means being pressed downwardly upon the ground solely by forces of gravity acting upon said auxiliary tool support while said main tool support occupies a position of vertical adjustment relative to said traveling support causing said tools on said main tool support to penetrate the ground to a predetermined adjustable depth, a hopper mounted on said traveling support, means for delivering material from said hopper into said furrow including a dispensing mechanism and clutch means for transmitting power to said dispensing mechanism, actuating means for said clutch means operatively connected with said adjusting means, whereby the transmission of power to said dispensing mechanism may be automatically stopped by upward adjustment of said main tool support, and lost motion connecting means between said auxiliary tool support and said adjusting means whereby said auxiliary tool support may be raised to an elevated position above the ground by upward adjustment of said main tool support.

6. An agricultural implement comprising, a self-sustained traveling support, a main tool support, adjusting means connecting said main tool support with said traveling support for vertical movement of said main tool support relative to said traveling support, tools mounted on said main tool support for movement into and out of the ground by said vertical movement of said main tool support, an auxiliary tool support, means cooperating with said main and auxiliary tool supports to connect said auxiliary tool support with said main tool support for vertical movement relative thereto, ground engaging means mounted on said auxiliary tool support for forming a seed furrow and a fertilizer furrow in soil prepared by said tools and for gauging the depth of said furrows, said ground engaging means being pressed downwardly upon the ground solely by forces of gravity acting upon said auxiliary tool support while said main tool support occupies a position of vertical adjustment relative to said traveling support causing said tools on said main tool support to penetrate the ground to a predetermined depth, a seed hopper and a fertilizer hopper mounted on said traveling support, means for delivering seed from said seed hopper into said seed furrow, and means for delivering fertilizer from said fertilizer hopper into said fertilizer furrow.

7. An agricultural implement comprising, a self-sustained traveling support, a main tool support, adjusting means connecting said main tool support with said traveling support for vertical translatory movement of said main tool support relative to said traveling support, an auxiliary tool support having ground engaging means adapted to sustain said auxiliary tool support for tilting movement in a vertical plane extending longitudinally of said traveling support, and stabilizing means cooperating with said main and auxiliary tool supports to connect said auxiliary tool support with said main tool support for self-adjusting vertical translatory movement of said auxiliary tool support relative to said main tool support.

8. An agricultural implement comprising, a self-sustained traveling support, a main tool support, adjusting means connecting said main tool support with said traveling support for vertical translatory movement of said main tool support relative to said traveling support, an auxiliary tool support having ground engaging means adapted to sustain said auxiliary tool support for tilting movement in a vertical plane extending longitudinally of said traveling support, stabilizing means cooperating with said main and auxiliary tool supports to connect said auxiliary tool support with said main tool support for self-adjusting vertical translatory movement of said auxiliary tool support relative to said main tool support, and lost motion connecting means between said auxiliary tool support and said adjusting means, whereby said auxiliary tool support may be raised to an elevated position above the ground by upward adjustment of said main tool support.

9. An agricultural implement comprising, a self-sustained traveling support, a main tool support, adjusting means connecting said main tool support with said traveling support for vertical translatory movement of said main tool support relative to said traveling support, an auxiliary tool support, ground engaging means mounted on said auxiliary tool support for forming a furrow and for gauging the depth of said furrow, said depth gauging means being adapted to sustain said auxiliary tool support for tilting movement in a vertical plane extending longitudinally of said traveling support, stabilizing means cooperating with said main and auxiliary tool supports to connect said auxiliary tool support with said main tool support for self-adjusting vertical translatory movement of said auxiliary tool support relative to said main tool support, a hopper mounted on said traveling support, and means for delivering material from said hopper into said furrow.

10. An agricultural implement comprising, a self-sustained traveling support, a main tool support, adjusting means connecting said main tool support with said traveling support for vertical translatory movement of said main tool support relative to said traveling support, an auxiliary tool support, a furrow opener mounted on said auxiliary tool support, a ground engaging skid secured to said furrow opener for gauging the depth of soil penetration of the latter and adapted to sustain said auxiliary tool support for tilting movement in a vertical plane extending longitudinally of said traveling support, a press wheel for closing the furrow opened by said furrow opener swingably mounted on said auxiliary tool support for self-adjusting vertical movement relative thereto, stabilizing means cooperating with said main and auxiliary tool supports to connect said auxiliary tool support with said main tool support for self-adjusting vertical translatory movement of said auxiliary tool support relative to said main tool support, a hopper mounted on said traveling support, and means for delivering material from said hopper into the furrow opened by said furrow opener.

11. An attachment for connection to a pair of transversely spaced tool bars of a cultivator, comprising a support having transversely spaced portions connectable, respectively, to said tool bars, a beam adapted to extend longitudinally of said tool bars in the space therebetween and having a bracket secured thereto rearwardly of said support, a pair of links mounted on said bracket for pivotal movements, respectively, about vertically spaced horizontal axes, said links being of equal lengths and being mounted on said support for pivotal movements relative thereto on horizontal axes, respectively, spaced vertically from each other substantially the same distance as said pivot axes of said links on said bracket, and a tool mounted on said beam for forming a furrow in the space between said tool bars.

12. An attachment for connection to a pair of transversely spaced tool bars of a cultivator, comprising a support having transversely spaced portions connectable, respectively, to said tool bars, a beam adapted to extend longitudinally of said tool bars in the space therebetween and having a bracket secured thereto rearwardly of said support, a pair of links mounted on said bracket for pivotal movements, respectively, about vertically spaced horizontal axes, said links being of equal lengths and being mounted on said support for pivotal movements relative thereto on horizontal axes, respectively, spaced vertically from each other substantially the same distance as said pivot axes of said links on said bracket, a pair of tools mounted on said support in transversely spaced relation to each other for working two relatively spaced strips of soil to a predetermined depth, and a tool mounted on said beam for forming a furrow in soil thrown up by said tools in the space between said tool bars and between said relatively spaced strips of soil.

13. An attachment for connection to a pair of transversely spaced tool bars of a cultivator, comprising a support having transversely spaced portions connectable, respectively, to said tool bars, a beam adapted to extend longitudinally of said tool bars in the space therebetween and having a bracket secured thereto rearwardly of said support, a pair of links mounted on said bracket for pivotal movements, respectively, about vertically spaced horizontal axes, said links being of equal lengths and being mounted on said support for pivotal movements relative thereto on horizontal axes, respectively, spaced vertically from each other substantially the same distance as said pivot axes of said links on said bracket, a pair of tools mounted on said support in transversely spaced relation to each other for working two relatively spaced strips of soil to a predetermined depth, another tool mounted on said support for working a third strip of soil to a predetermined depth in the space between said tool bars and between said relatively spaced strips of soil, and a tool mounted on said beam for forming a furrow in soil of said third strip of soil prepared by the second soil tool.

14. In combination with a tractor, a pair of tool bars spaced from each other transversely of said tractor, adjusting means connecting said tool bars with said tractor for vertical translatory movement relative thereto, a cross bar secured to said tool bars, a bracket structure secured to a portion of said cross bar intermediate said tool bars, a beam extending transversely of said cross bar, another bracket structure secured to said beam, parallel link mechanism pivoted on said bracket structures to connect said beam with said cross bar for vertical translatory movement relative thereto, and ground engaging means mounted on said beam for forming a furrow and for gauging the depth of said furrow.

15. In combination with a tractor having a pair of axially spaced rear wheels, a main tool support including a pair of tool bars spaced from each other transversely of said tractor in advance of a vertical plane through the axis of said rear wheels, adjusting means connecting said main tool support with said tractor for vertical translatory movement relative thereto, a draft member secured to said tool bars, an auxiliary tool support including a runner beam extending rearwardly into the space between said rear wheels, parallel link mechanism pivoted on said draft member between said tool bars and on said auxiliary tool support to connect said auxiliary tool support with said draft member for vertical translatory movement relative thereto, and ground engaging means mounted on said runner beam including a seed runner extending into the space between said rear wheels, a fertilizer runner in advance of said seed runner, and a gauge element for gauging the depth of soil penetration of said runners.

16. In combination with a tractor having a pair of axially spaced rear wheels and a pair of axially spaced front wheels, a main tool support including a pair of tool bars at opposite sides, respectively, of a central vertical plane extending longitudinally of said tractor, one of said tool bars having a longitudinal portion, at one side of said plane, spaced therefrom a shorter distance than the tractor front and rear wheels at said side of said plane, and the other of said tool bars having a longitudinal portion, at the other side of said plane, spaced therefrom a shorter distance than the tractor front and rear wheels at said other side of said plane, adjusting means connecting said main tool support with said tractor for vertical translatory movement relative thereto, a cross member of shorter length than the axial spacing of said front wheels extending transversely of said tool bars in the space between the axes of said front and rear wheels, detachable fastening means securing said cross member to said longitudinal portions of said tool bars, an auxiliary tool support disposed between said tool bars, and parallel link mechanism pivoted on said cross member and on said auxiliary tool support to connect said auxiliary tool support with said main tool support for vertical translatory movement relative thereto.

17. In an agricultural implement, a self-sustained traveling support, a main tool support, means connecting said main tool support to said traveling support for vertical translatory movement only of said main tool support and for attachment of said main tool support at an adjustable height relative to said traveling support, an auxiliary tool support, means connecting said auxiliary tool support with said main tool support for free vertical movement of said auxiliary tool support relative to said main tool support, a ground working tool supported on said auxiliary tool support and having a constant tilt at all adjustments of said main tool support, said ground working tool being pressed downward onto the ground solely by forces of gravity acting upon said auxiliary tool support, means for supporting said auxiliary tool support and said ground working tool on ground to cause said ground working tool to penetrate the soil to a constant depth, a hopper mounted on said traveling support, and means for delivering material from said hopper onto the ground subject to the action of said ground working tool.

18. In an agricultural implement, a self-sustained traveling support, a main tool support, means comprising a pair of parallel pivoted links and a lifting mechanism connecting said main tool support to said traveling support for vertical translatory movement of said main tool support and for attachment of said main tool support at an adjustable height relative to said traveling support, an auxiliary tool support, means pivotally connecting said auxiliary tool support to said main tool support for free vertical movement of said auxiliary tool support relative to said main tool support, a ground working tool supported on said auxiliary tool support, said ground working tool being pressed downward onto the ground solely by forces of gravity acting on said auxiliary tool support, a hopper mounted on said traveling support, means for supporting said auxiliary tool support and said ground working tool on ground to cause said ground working tool to penetrate the soil to a constant depth, and means for delivering material from said hopper onto ground subject to the action of said ground working tool.

19. In an agricultural implement, a self-sustained traveling support, a main tool support, means connecting said main tool support to said traveling support for vertical movement of said main tool support and for attachment of said main tool support at an adjustable height relative to said traveling support, a first ground working means supported on said main tool support for preparing the ground for the action of a second ground working means, an auxiliary tool support, means connecting said auxiliary tool support to said main tool support for free vertical movement of said auxiliary tool support relative to said main tool support, second ground working means supported on said auxiliary tool support, said second ground working means working the ground prepared by the said first ground working means and being pressed downward onto the ground solely by the forces of gravity acting on said auxiliary tool support, means for supporting said auxiliary tool support and said ground working tool on ground to cause said ground working tool to penetrate the soil to a constant depth, a hopper supported on said traveling support, and means for delivering material from said hopper onto ground in rear of said second ground working means.

20. In an agricultural implement, a self-sustained traveling support, a main tool support, means connecting said main tool support to said traveling support for vertical translatory movement of said main tool support and for attachment of said main tool support at an adjustable height relative to said traveling support, an auxiliary tool support, means connecting said auxiliary tool support to said main tool support for vertical movement of said auxiliary tool support relative to said main tool support, ground working means severally supported on said tool supports, means operable responsive to upward vertical movement of said main tool support only above a predetermined height for causing upward vertical movement of said auxiliary tool support, lifting means connected to said auxiliary tool support for causing upward vertical movement of said auxiliary tool support independently of movement of said main tool support, a hopper supported on said traveling support, and means for delivering material from said hopper onto ground subject to the action of said ground working means.

21. In an agricultural implement, a self-sustained traveling support, a main tool support, means connecting said main tool support to said traveling support for vertical translatory movement of said main tool support and for attachment of said main tool support at an adjustable height relative to said traveling support, an auxiliary tool support, means connecting said auxiliary tool support to said main tool support for vertical movement of said auxiliary tool support relative to said main tool support, a ground working means supported on said auxiliary tool support, means operable responsive to upward vertical movement of said main tool support only above a predetermined height for causing upward vertical movement of said auxiliary tool support, lifting means connected to said auxiliary tool support for causing vertical upward movement of said auxiliary tool support independently of said upward vertical movement of said main tool support, a hopper supported on said traveling support, means for delivering material from said hopper onto ground subject to the action of said ground working means, and means operable responsive to vertical upward movement of said main tool support to prevent said delivery of material from said hopper.

22. In an agricultural implement, a self-sustained traveling support, a main tool support, means connecting said main tool support to said traveling support for vertical translatory movement of said main tool support and for attachment of said main tool support at an adjustable height relative to said traveling support, an auxiliary tool support, means connecting said auxiliary tool support to said main tool support for free vertical movement of said auxiliary tool support relative to said main tool support, a ground working tool supported on said auxiliary support, said ground working tool being pressed downward onto the ground solely by forces of gravity acting upon said auxiliary tool support, means for supporting said auxiliary tool support and said ground working tool on ground to cause said ground working tool to penetrate the soil to a constant depth and means for delivering material onto the ground subject to the action of said ground working tool.

JOHN D. McKAHIN.

---

CERTIFICATE OF CORRECTION.

Patent No. 2,365,201. December 19, 1944.

JOHN D. McKAHIN.

It is hereby certified that error appears in the printed specification of the above numbered patent requiring correction as follows: Page 8, first column, line 8, claim 13, for the word "soil" read --said--; page 9, first column, line 33, claim 21, before "ground" strike out --a--; and that the said Letters Patent should be read with this correction therein that the same may conform to the record of the case in the Patent Office.

Signed and sealed this 20th day of March, A. D. 1945.

Leslie Frazer
(Seal)   Acting Commissioner of Patents.

means connecting said main tool support to said traveling support for vertical translatory movement of said main tool support and for attachment of said main tool support at an adjustable height relative to said traveling support, an auxiliary tool support, means connecting said auxiliary tool support to said main tool support for vertical movement of said auxiliary tool support relative to said main tool support, ground working means severally supported on said tool supports, means operable responsive to upward vertical movement of said main tool support only above a predetermined height for causing upward vertical movement of said auxiliary tool support, lifting means connected to said auxiliary tool support for causing upward vertical movement of said auxiliary tool support independently of movement of said main tool support, a hopper supported on said traveling support, and means for delivering material from said hopper onto ground subject to the action of said ground working means.

21. In an agricultural implement, a self-sustained traveling support, a main tool support, means connecting said main tool support to said traveling support for vertical translatory movement of said main tool support and for attachment of said main tool support at an adjustable height relative to said traveling support, an auxiliary tool support, means connecting said auxiliary tool support to said main tool support for vertical movement of said auxiliary tool support relative to said main tool support, a ground working means supported on said auxiliary tool support, means operable responsive to upward vertical movement of said main tool support only above a predetermined height for causing upward vertical movement of said auxiliary tool support, lifting means connected to said auxiliary tool support for causing vertical upward movement of said auxiliary tool support independently of said upward vertical movement of said main tool support, a hopper supported on said traveling support, means for delivering material from said hopper onto ground subject to the action of said ground working means, and means operable responsive to vertical upward movement of said main tool support to prevent said delivery of material from said hopper.

22. In an agricultural implement, a self-sustained traveling support, a main tool support, means connecting said main tool support to said traveling support for vertical translatory movement of said main tool support and for attachment of said main tool support at an adjustable height relative to said traveling support, an auxiliary tool support, means connecting said auxiliary tool support to said main tool support for free vertical movement of said auxiliary tool support relative to said main tool support, a ground working tool supported on said auxiliary support, said ground working tool being pressed downward onto the ground solely by forces of gravity acting upon said auxiliary tool support, means for supporting said auxiliary tool support and said ground working tool on ground to cause said ground working tool to penetrate the soil to a constant depth and means for delivering material onto the ground subject to the action of said ground working tool.

JOHN D. McKAHIN.

CERTIFICATE OF CORRECTION.

Patent No. 2,365,201.    December 19, 1944.

JOHN D. McKAHIN.

It is hereby certified that error appears in the printed specification of the above numbered patent requiring correction as follows: Page 8, first column, line 8, claim 13, for the word "soil" read --said--; page 9, first column, line 33, claim 21, before "ground" strike out --a--; and that the said Letters Patent should be read with this correction therein that the same may conform to the record of the case in the Patent Office.

Signed and sealed this 20th day of March, A. D. 1945.

Leslie Frazer
(Seal)  Acting Commissioner of Patents.